United States Patent [19]
Ward

[11] 3,736,011
[45] May 29, 1973

[54] QUICK DISCONNECT TOOL COUPLING

[75] Inventor: James E. Ward, Glendora, Calif.

[73] Assignee: Tool & Equipment Mfg. Co., Inc., Monrovia, Calif.

[22] Filed: Mar. 2, 1972

[21] Appl. No.: 231,163

[52] U.S. Cl. ............................. 287/103 A, 279/91
[51] Int. Cl. ..................................... F16b 7/20
[58] Field of Search ................. 287/119 R, 103 A, 287/103 D; 279/9, 103, 91, 1 B; 408/204

[56] References Cited

UNITED STATES PATENTS

| 2,719,722 | 10/1955 | Nickless | 279/103 X |
| 3,512,793 | 5/1970 | Botimer | 279/91 |
| 3,592,554 | 7/1971 | Takahara | 408/204 |
| 3,609,056 | 9/1971 | Hougen | 408/204 |

Primary Examiner—Andrew V. Kundrat
Attorney—Robert L. Parker, C. Russell Hale, R. William Johnston et al.

[57] ABSTRACT

This torque transmitting quick disconnect coupling is particularly useful with concrete coring tools and the like. It includes a female member in the form of a sleeve having a self releasing tapered socket at one end and a pair of opposed radially extending slots in its sides, extending from the wider open end of the taper for part of its length. A collar is threaded onto the outside of the sleeve from the end having the taper. An inwardly directed flange at one end of the collar defines an internal annular groove. A pair of slots are cut through the flange. A combination of pins and a set screw limit rotation of the collar between one position with the slots in the sleeve and collar aligned with each other and a second position less than 180° from the first so that the slots are not aligned. The quick disconnect coupling also includes a male member having a self releasing tapered shank and a pair of opposed pins extending radially from a portion of the tapered shank a maximum distance less than the inside diameter of the annular groove. Thus, when the collar is rotated with the slots in alignment, the pins can pass therethrough permitting the shank to seat in the socket. The collar is then turned on its threads so that the flange cams against the pins to retain the shank in position.

5 Claims, 5 Drawing Figures

Patented May 29, 1973

3,736,011

3,736,011

QUICK DISCONNECT TOOL COUPLING

BACKGROUND

With the large number of reinforced concrete structures being built, there has developed a substantial need for coring tools to provide holes through concrete walls and the like. Typically these tools are in the form of hollow cylinders having diamonds or other cutting particles imbedded in one lip thereof. When such a tool is rapidly rotated on a concrete structure, an annular path is cut, leaving a concrete core which can be removed to leave a hole through the wall or the like. These coring tools are subject to severe wear and must be periodically replaced. In addition, during the course of coring a reinforced concrete structure, the coring tool may encounter a steel reinforcing member. While a coring tool is passing through concrete, it is usually advantageous to use diamond as the abrasive. When a steel reinforcing member is encountered, it is often desirable to switch to a coring tool using cemented metal carbides as the abrasive because of their increased toughness. After the coring tool has passed through the steel reinforcing member, one may wish to reinstall a diamond tipped coring tool to continue through the reinforced concrete. Thus, during the course of a single drilling operation, two or more tool changes may prove to be desirable.

In the past, concrete coring tools have often been threaded directly onto the shaft of the driving motor. High torques are involved in concrete coring and it is rather common to find that such threaded connections become extremely tight and very difficult to remove. Thus, it is often necessary to use a large wrench and an extra length of pipe on the end of the wrench in order to break a tightly threaded joint. This is extremely time consuming, and if several tool changes are required during the course of drilling one hole, the cost may become prohibitive.

In attempts to remedy the difficulty of disconnecting a concrete coring tool from the driving motor, a few types of quick disconnect couplings have been tried. Thus, for example, ball detents retained in place by a surrounding sleeve have been tried. Because of the high forces involved, strong springs are required and such quick disconnects are difficult to operate by hand. Other attempts at providing a quick disconnect between a concrete coring tool and a drive motor have been unsatisfactory for a variety of reasons such as high cost, large size or difficulty of hand operation.

BRIEF SUMMARY OF THE INVENTION

There is, therefore, provided in practice of this invention according to a presently preferred embodiment, a quick disconnect coupling having a male member and a female member. The male member has a self-releasing tapered shank with a pair of opposed pins extending radially from a portion of the shank. The female member comprises a sleeve having a self releasing tapered socket at one end for receiving the tapered shank. A pair of opposed radially extending slots in the sides of the sleeve receive the pins for transmitting torque. There is a collar threaded onto the outside of the sleeve, including an internal annular groove that fits over the ends of the pins. An inwardly directed flange at one end of the groove has a pair of slots cut therethrough, so that when aligned with the slots in the sleeve the pins can be inserted. Means are provided on the female member for limiting rotation of the collar.

DRAWINGS

These and other features and advantages of this invention will be appreciated as the same becomes better understood by reference to the following detailed description of a presently preferred embodiment when considered in connection with the accompanying drawings wherein.

DESCRIPTION

Figure 1:
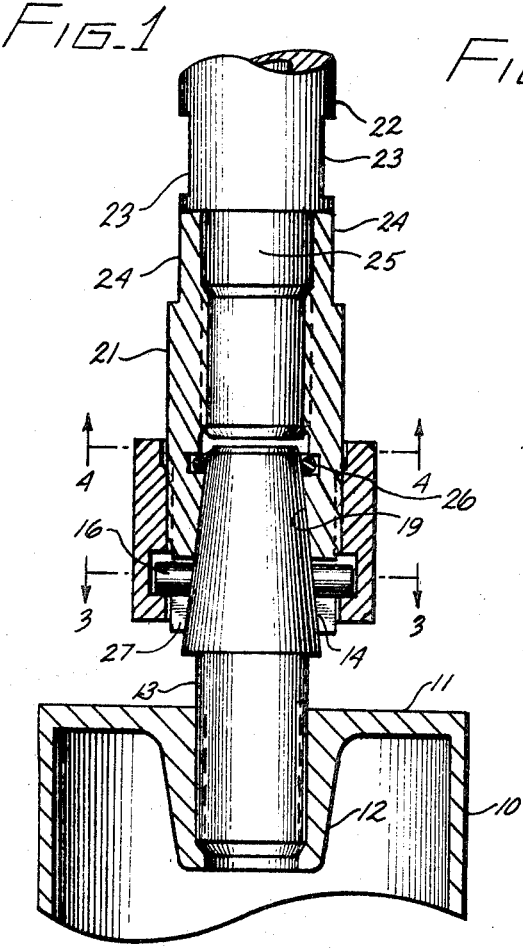
FIG. 1 illustrates in longitudinal cross-section a quick disconnect tool coupling constructed according to principles of this invention.

A quick disconnect coupling constructed according to principles of this invention is illustrated in longitudinal cross-section in FIG. 1. As illustrated in this presently preferred embodiment, the coupling is connected to a conventional concrete coring tool 10, one end of which is shown somewhat generally in FIG. 1. The coring tool is in the form of a hollow cylinder having an end closure 11 at its non-cutting end. A female threaded boss 12 in the center of the end closure permits connection of the coring tool on a threaded shaft. In the past, it has sometimes been the practice to thread such a coring tool directly on the shaft of a driving motor which, as pointed out hereinabove, can lead to substantial problems in disconnecting.

In the illustrated embodiment, a threaded shaft 13 of the male member of a quick disconnect coupling is threaded into the boss 12 in the coring tool. At the opposite end of the shaft 13, there is a self-releasing tapered shank 14 in the form of a truncated cone. A self-releasing taper is to be distinguished from a locking or self-holding taper which is employed on some arbors. A self-releasing taper has a large enough angle in the cone that the friction of engagement of the shank in a similar socket is not sufficient for holding the shank in place. In a self-holding or locking taper, on the other hand, the angle of the cone is rather small and friction will retain the shank in the socket and it must be forceably removed. By using a self-releasing tapered shank in the quick disconnect coupling, the two halves of the coupling can be readily separated by hand as will be more apparent hereinafter.

Figure 3:
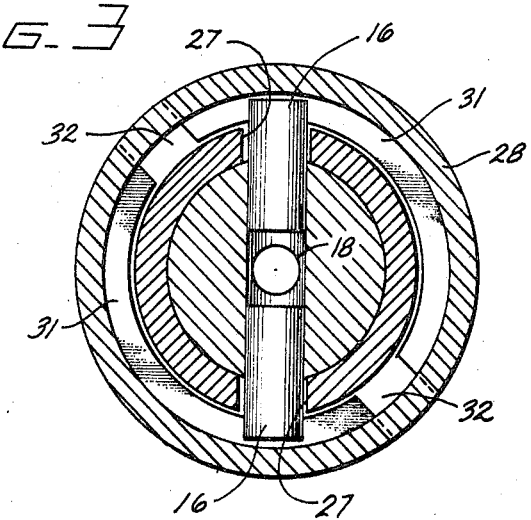
FIG. 3 is a transverse cross-section through the coupling of FIG. 1.

A pair of opposed cylindrical pins 16 extend radially from the shank part way along the length thereof. As best seen in FIG. 3, these pins 16 are force-fit into a transverse hole 17 through the shank. The pair of pins are pressed in less than half the radius of the shank at that point so that they do not block an axial passage 18 used to transmit cooling water to the interior of the coring tool 10.

As seen in FIG. 1, the shank 14 fits snugly into a self-releasing tapered socket 19 in a sleeve 21. The drive shaft 22 of a drive motor for a coring tool is threaded into the opposite end of the sleeve 21. This drive shaft conventionally has an axial passage 20 through which cooling water is delivered to the coring tool. A pair of flats 23 on the motor shaft and another pair of flats 24 on the sleeve permit the threaded joint to be made or broken as desired. A cylindrical portion 25 on the shaft fits into the sleeve to assure alignment. A conventional O-ring 26 near the small end of the tapered socket 19 provides a seal against the tapered shank 14 to minimize cooling water leakage.

The end of the sleeve 21 having the tapered socket, has a pair of opposed slots 27 opening to the end of the sleeve, so that the pins 16 are accommodated when the tapered shank is inserted. The slots 27 serve to transmit torque from the sleeve to the pins so that the coupling can transmit torque from the motor shaft 22 to the coring tool 10. The coupling, thus, does not rely on the tapered shank and socket to transmit substantial torque and these parts simple serve to hold the shank and socket in alignment.

Figure 2:
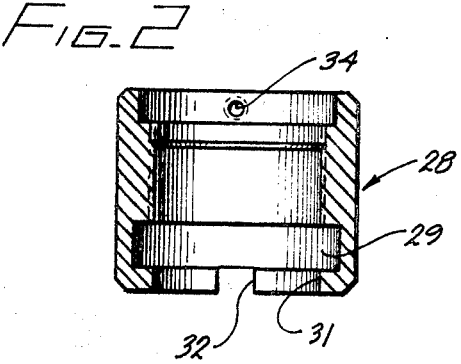
FIG. 2 illustrates in longitudinal cross-section a collar on the coupling of FIG. 1.

The outside of the sleeve 21 is threaded to receive an internally threaded knurled nut or collar 28 from the socket end of the sleeve. The collar 28 is also illustrated in longitudinal cross-section in FIG. 2. An internal annular groove 29 is provided inside the collar. The width of the groove, that is, its extent along the length of the collar, is greater than the diameter of the pins 16 in the shank. The inside diameter of the annular groove 29 is greater than the distance between the ends of the two pins, so that when the coupling is connected, as illustrated in FIG. 1, the collar 28 can be rotated with the pins positioned in the internal annular groove. An inwardly extending flange 31 defines one end of the annular groove 29. A pair of opposed transverse slots 32 extend across the collar so as to interrupt the flange 31 at opposite sides of the collar. As will become apparent, the slots need not extend the full radial distance of the collar for proper operation of the coupling, and only an interruption of the flange 31 is needed. The radially extending slots are, however, quite convenient for fabrication of the collar, since it is only necessary to run a milling cutter across the end.

When the collar 28 is rotated so that the slots 32 are not in alignment with the pins 16 as seen in FIG. 3, the flange 31 engages the pins 16 and prevents the tapered shank 14 from being withdrawn from the socket. On the other hand, when the collar 28 is rotated so that the slots 32 are in alignment with the slots 27 in the sleeve, and hence with the pins 16, the shank can be readily removed from the socket. When the collar is rotated on the threaded sleeve, the flange 31 is brought into tight engagement with the pins to force the tapered shank into engagement with the socket. This assures that the coupling is free of play and the coring tool is aligned with the drive shaft. When the collar is rotated on the threads to bring its slots 32 into alignment with the pins 16 so that the shank can be removed, the flange is disengaged from the pins. Since there is no torque applied to the collar during operation of the apparatus, it is found that the collar can be tightened by hand to lock the tapers in place and readily released by hand so that the shank can be removed.

Figure 4:
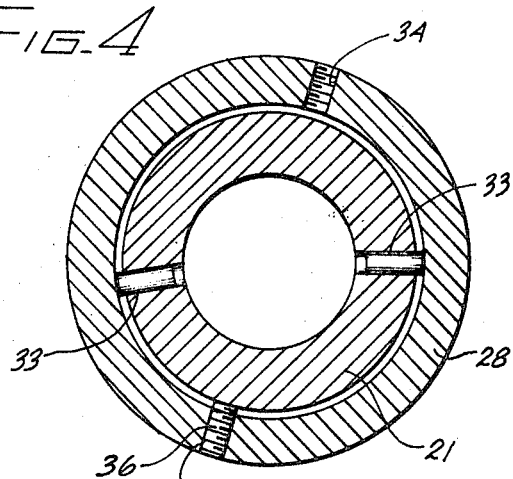
FIG. 4 is another transverse cross-section through the coupling of FIG. 1.

It is preferable that the collar 28 have a limited degree of rotation so that after the pins are inserted through the slots 32, it is necessary to turn the collar less than one-half turn in order to lock the tapers together. Therefore, as illustrated in FIG. 4, a pair of stop pins 33 are force-fitted into radially extending holes in the side of the sleeve in the portion beneath the end of the collar remote from the flange 31 (FIG. 1). Each of the stop pins 33 has an end extending a short distance out from the exterior of the sleeve. The two stop pins are not diametrically opposed on the sleeve, but instead, one of them is off-set about 10° from alignment with the other. The two stop pins, thus, divide the periphery into two segments of 170° and 190° respectively.

A pair of threaded holes 34 extend through the collar 28 and a set screw 36 is inserted in one of the holes. The holes are provided in the end portion of the collar remote from the flange so that as the collar is rotated on the threaded sleeve, the end of the set screw 36 intersects the stop pins 33 and limits the extent of possible rotation of the collar. When the coupling is first assembled, the set screw 36 is withdrawn, and the collar is screwed down until the flange 31 engages the pins 16 to secure the two tapered pieces together. At this point the set screw is inserted in the appropriate hole 34 so as to be in the narrower 170° segment between the stop pins 33. The other threaded hole 34 is unused and is merely a manufacturing convenience. Thereafter, the collar is loosened so that the slots therein align with the pins permitting the shank to be freely removed. The set screw needs to be positioned only the first time. Thereafter the sleeve will receive any tapered shank similar to the first one used and the collar will properly lock it in place.

The stop pins 33 and set screw 36 are positioned so that when the set screw is in engagement with one of the stop pins, the slots 32 in the collar are aligned with the slots 27 in the sleeve. Thus, to install or remove the male shank from the female socket one merely needs to back off the collar until it reaches the stop formed by the set screw and one of the stop pins, which assures that the slots are in proper alignment. Once the shank is in place, the collar is merely twisted in the opposite direction and the pitch of the threads brings the flange into engagement with the torque carrying pins 16 before the collar has rotated 180°. Typically it is found that only about 90° rotation occurs before the tapers are locked in place with a thread pitch of 12 per inch.

The stop pins and set screw cooperate to keep the collar in the narrow range of rotation for quick connecting and disconnecting and keep it from getting lost from the coupling. It will be apparent that if desired, the degree of rotation of the collar that is permitted, may be limited by a stop pin or set screw through a portion of the collar that permits the stop pin to encounter the torque carrying pin 16 through the shank. Two set screws and one stop pin would also be effective. Other means for limiting the rotation of the collar will be apparent to one skilled in the art.

Figure 5:
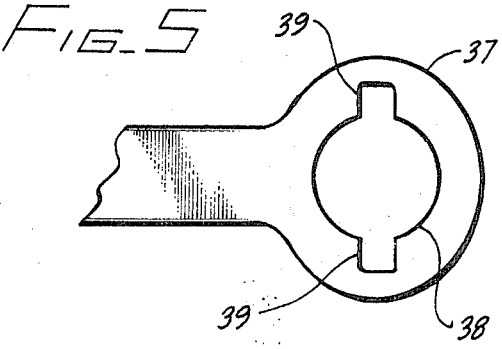
FIG. 5 illustrates an end of a special wrench useful with the coupling.

FIG. 5 illustrates an end of a special wrench 37 useful for disconnecting a male member of the quick disconnect coupling from a coring tool or the like. The wrench has a generally circular hole 38 with a diameter about the same as the diameter of the tapered shank at the torque transmitting pins. Opposed openings 39 at the sides of the circular hole receive the torque transmitting pins when the wrench is put on a shank and transmit torque from the wrench to the pins. Conventional tools grip a coring tool or the like for removal of a shank therefrom. The other end of the wrench may conveniently have a conventional open end to fit on the flats 24 on the sleeve.

Although but one embodiment of quick disconnect coupling constructed according to principles of this invention, has been described and illustrated herein, many modifications and variations will be apparent to one skilled in the art. Thus, for example, instead of the male shank being connected to a male threaded bar, suitable arrangements can be made for connection to other torque carrying members. Similarly, if desired, the tapered socket can be a blind hole and means other than a threaded sleeve used to connect other torque carrying members. Further, although particularly useful with concrete coring tools having high torque and a need for rapid replacement, it will be apparent that the quick disconnect coupling may be used with other torque transmitting systems. Many other modifications and variations will be apparent to one skilled in the art and it is therefore to be understood that within the scope of the appended claims the invention may be practiced otherwise than as specifically described.

What is claimed is:

1. A torque transmitting quick disconnect coupling including a male member comprising:
   a self releasing tapered shank; and
   a pair of opposed pins extending radially from a portion of the tapered shank; and a female member comprising:
   a sleeve having a self-releasing tapered socket at one end and a pair of opposed slots in the sides of the sleeve extending from the wider open end of the taper for part of the length thereof,
   a collar threaded onto the outside of the sleeve including an internal annular groove having an inside diameter greater than the maximum span of the pins on the male member, an inwardly directed flange at one end of the annular groove, and a pair of opposed radially extending openings through the flange for providing clearance for the pins on the male member, and
   means for limiting rotation of the collar between a first position with the slots in the collar aligned with the slots in the sleeve and a second position less than 180°from the first position; comprising:
   a pair of circumferentially spaced apart stop pins extending outwardly from the sleeve in a portion thereof beneath the collar, and
   a set screw in the collar having an end extending inwardly from a portion of the collar overlying the stop pins and circumferentially between the stop pins for interference therewith.

2. A quick disconnect coupling as defined in claim 1, wherein the female member further comprises an internally threaded portion in the opposite end of the sleeve from the tapered socket; and an internal O-ring groove in the sleeve at the smaller end of the tapered socket.

3. A quick disconnect coupling as defined in claim 2, wherein the male member further comprises a threaded bar on the opposite end therefrom from the tapered shank; and an axially extending passage through the male member.

4. A torque transmitting quick disconnect coupling including a male member comprising:
   a self-releasing tapered shank,
   a threaded bar on the opposite end thereof from the male shank, an axial passage through the male member, and a pair of opposed pins extending radially from a portion of the tapered shank; a female member comprising:
   a sleeve having a self-releasing tapered socket at one end, a pair of opposed slots in the sides of the sleeve extending from the wider open end of the taper for a portion of the length thereof for receiving the pins, a male thread on the outside of the sleeve around the smaller end of the socket further from the end of the sleeve than the roots of the slots, a female threaded portion on the opposite end thereof from the socket, and an internal O-ring groove at the smaller end of the tapered socket;
   a collar including a female thread engaged with the male thread on the sleeve, an internal annular groove having an inside diameter greater than the greatest span of the pins on the male member, an inwardly directed flange at the end of the annular groove remote from the threads, and a pair diametrically opposed interruptions in the flange sufficiently wide for passing the ends of the pins on the male member, the pitch on the threads between the collar and sleeve being sufficient for camming the flange against the pins when the male shank is seated in the female socket; and means for limiting unthreading of the collar relative to the sleeve by more than one-half revolution beyond a position with the flange in engagement with the pins comprising a pair of stop pins extending outwardly from the sleeve in a portion thereof beneath the collar and a set screw in the collar having an end extending inwardly from a portion thereof overlying the stop pins for interference therewith.

5. A female member of a concrete coring tool quick disconnect coupling comprising:
   a sleeve having a self-releasing tapered socket at one end and a female threaded portion at the other end, said sleeve including a pair of opposed slots in the sides of the sleeve extending from the wider open end of the taper for a portion of the length thereof, a male threaded portion on the outside of the sleeve beyond the roots of the slots, and an internal O-ring groove adjacent the smaller end of the tapered socket;
   a collar including a female thread on the male thread, said collar including an internal annular groove, an inwardly directed flange at the end of the annular groove remote from the female threads, and a pair of diametrically opposed interruptions extending from the end of the collar through the flange; and
   means for limiting rotation of the collar on the threads between a first position with the interruptions in the flange aligned with the slots in the sleeve and a second position less than 180° from the first position comprising a pair of stop pins extending outwardly from the sleeve in a portion thereof beneath the collar and a set screw in the collar having an end extending inwardly in a portion between the pins.

* * * * *